(12) United States Patent  
Palmateer

(10) Patent No.: US 7,268,893 B2  
(45) Date of Patent: Sep. 11, 2007

(54) OPTICAL PROJECTION SYSTEM

(75) Inventor: John W. Palmateer, Gig Harbor, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/987,236

(22) Filed: Nov. 12, 2004

(65) Prior Publication Data

US 2006/0103853 A1 May 18, 2006

(51) Int. Cl.
G01B 11/24 (2006.01)
G01C 21/02 (2006.01)

(52) U.S. Cl. ........... 356/601; 356/139.03; 356/152.2; 250/206.1

(58) Field of Classification Search ........ 356/601–625, 356/4.09, 152.2; 382/141, 149, 286; 250/206.1, 250/206.2; 438/135
See application file for complete search history.

(56) References Cited

U.S. PATENT DOCUMENTS

| | | | | |
|---|---|---|---|---|
| 4,322,080 | A | * | 3/1982 | Pennington .................. 463/52 |
| 5,085,502 | A | * | 2/1992 | Womack et al. ............ 356/605 |
| 5,207,003 | A | * | 5/1993 | Yamada et al. ............... 33/293 |
| 5,341,183 | A | | 8/1994 | Dorsey-Palmateer |
| 5,444,505 | A | | 8/1995 | Dorsey-Palmateer |
| 5,450,147 | A | | 9/1995 | Dorsey-Palmateer |
| 5,461,478 | A | * | 10/1995 | Sakakibara et al. ......... 356/623 |
| 5,493,392 | A | * | 2/1996 | Blackmon et al. ..... 356/139.03 |
| 5,506,641 | A | | 4/1996 | Dorsey-Palmateer |
| 5,557,410 | A | * | 9/1996 | Huber et al. ................. 356/604 |
| 5,561,526 | A | * | 10/1996 | Huber et al. ................. 356/604 |
| 5,651,600 | A | | 7/1997 | Dorsey-Palmateer |
| 6,045,651 | A | * | 4/2000 | Kline et al. ................. 156/285 |
| 6,136,946 | A | * | 10/2000 | Yao et al. .................... 528/196 |
| 6,438,272 | B1 | * | 8/2002 | Huang et al. ............... 382/286 |
| 6,480,271 | B1 | | 11/2002 | Dorsey Palmateer |
| 6,753,907 | B1 | * | 6/2004 | Sukthankar et al. ..... 348/222.1 |
| 6,807,860 | B1 | * | 10/2004 | Reed et al. .................... 73/614 |
| 7,001,023 | B2 | * | 2/2006 | Lee et al. ...................... 353/69 |
| 7,092,109 | B2 | * | 8/2006 | Satoh et al. ................ 356/620 |

* cited by examiner

Primary Examiner—Sang H. Nguyen
(74) Attorney, Agent, or Firm—Alston & Bird LLP

(57) ABSTRACT

There is provided an optical projection system for projecting an image onto an object that is being manufactured and/or inspected. The system includes an image-projecting device, a target-locating device for determining the orientation of the image-projecting device relative to the object, and an image-rendering device for rendering the image that is projected onto the object. The target-locating device advantageously comprises a camera that locates at least one target in mechanical communication with the object to determine the orientation of the image-projecting device relative to the object. The image-rendering device advantageously stores a three-dimensional representation of the object that is converted into a two-dimensional image that is projected upon the object. The image projected upon the object is advantageously used during assembly and/or inspection of the object.

27 Claims, 3 Drawing Sheets

OPTICAL PROJECTION SYSTEM

BACKGROUND OF THE INVENTION

1. Field of the Invention

The present invention is related to optical projection systems, and more particularly, to optical projection systems used during the assembly or inspection of objects.

2. Description of Related Art

During the manufacturing of an object, measurements are typically taken of various parameters of the object and features or details of that object are often located for verification purposes. Depending upon the size and shape of the object, the measurements may be relatively difficult to make. In particular, physical measurements, such as thickness or length, often depend upon the exact locations of the object from which the measurements are taken, most notably with traditional vision systems for measurements. For manual measurements, technicians often experience difficulty in ascertaining the exact location of measurement points.

One method and device for assisting in the measurement of an object is the use of a mylar that may be placed upon the object to define particular locations to measure the object and/or to locate details on the object. For example, the aerospace industry typically uses large mylars with lines and points that provide reference points for measurements when the mylar is placed upon the object. Such mylars may be very large for relatively large objects, such as an airplane wing structure. These mylars can be very expensive to create and maintain, and are also time-consuming to use during the assembly or inspection of the object.

An alternative method and device for assisting in the measurement of an object includes the use of a laser projector which projects a laser beam upon the object to define particular locations to measure the object. The laser projector typically projects a single laser beam that is reflected at a very fast rate off a moving reflector such that the single laser beam appears to create a two dimensional image. Not only are such laser projectors very expensive, but they are of limited use. Images projected onto an object by a laser projector typically can not be used with a photogrammetry system as targeting on an object because during the single moment that a photo or other recorded image is captured, the image projected onto the object is not entirely visible due to the nature of the constantly moving laser beam. Furthermore, such laser projectors can not project multiple colors or large amounts of text onto the object, both of which can assist a technician during the assembly or inspection of an object.

Therefore, a need exists for an optical projection system that provides an image on an object to facilitate inspection of that object. In particular, the optical projection system should provide an image that is capable of being conveniently utilized by technicians during manual assembly or inspection of the object, or be used in connection with a photogrammetric measuring device.

BRIEF SUMMARY OF THE INVENTION

The invention addresses the above needs and achieves other advantages by providing an optical projection system that provides an image on the object that may be used by various photogrammetric measuring devices and that may be used during manual assembly or inspection of the object. Specifically, the present invention projects an image that comprises a substantially static two-dimensional image, rather than a moving laser beam that creates the illusion of a two-dimensional image. Furthermore, the optical projection systems of the present invention may project multiple colors and/or text that may be used by technicians during the assembly and/or inspection of the object.

An optical projection system according to one embodiment of the present invention includes an image-projecting device, which is advantageously a digital projector, for projecting the image onto the object. The optical projection system also includes a target-locating device, such as a camera, for determining the misalignment between targets on or near the object and corresponding images projected by the image-projecting device. Advantageously, the target-locating device is capable of locating at least one target, preferably three or more targets, such as a measurement point on the object or a cooperative target on or near the object. The optical projection system also includes an image-rendering device for rendering the image that is projected, wherein the image is rendered according to the determined orientation of the image-projecting device relative to the object. Advantageously, the image-rendering device stores a three-dimensional representation of the object which is converted into a two-dimensional image that is projected onto the object. The optical projection system advantageously includes a measurement device that measures a portion of the object and communicates the measurement to the image-rendering device for appropriately rendering and sizing of the image.

A method for inspecting an object is also provided according to the present invention. The orientation of the image-projecting device, relative to the object, is determined which is advantageously performed by detecting at least one target, preferably three targets, that is/are in mechanical communication with the object. An image is then rendered based upon the determined orientation of the image-projecting device relative to the object. The rendering of the image advantageously comprises the converting of a three-dimensional representation to a two-dimensional image. The image is projected upon the object by an image-projecting device. Advantageously, the image has linear and non-linear patterns, can be multi-colored, and may or may not have text. The method advantageously includes the step of measuring at least one parameter of the object to define a characteristic of the object, such as a measurement, and that measurement is advantageously communicated electronically to the image-rendering device for possible inclusion in the image projected upon the object. The method of the present invention may also provide other steps for inspecting an object.

Therefore, embodiments of the present invention provide an image on the surface of an object being assembled or inspected so as to assist in the assembly or inspection of the object. A projected image that comprises a substantially static two-dimensional image, rather than a moving laser point or line segment, can be used by photogrammetric measurement devices as targets at predefined and rendered positions. The image can also be used to assist in the inspecting and/or assembly of the object. In addition, the colors, patterns, and/or text provided by the projected image may assist technicians during the assembly and/or inspection of the object.

BRIEF DESCRIPTION OF THE SEVERAL VIEWS OF THE DRAWINGS

Figure 1:
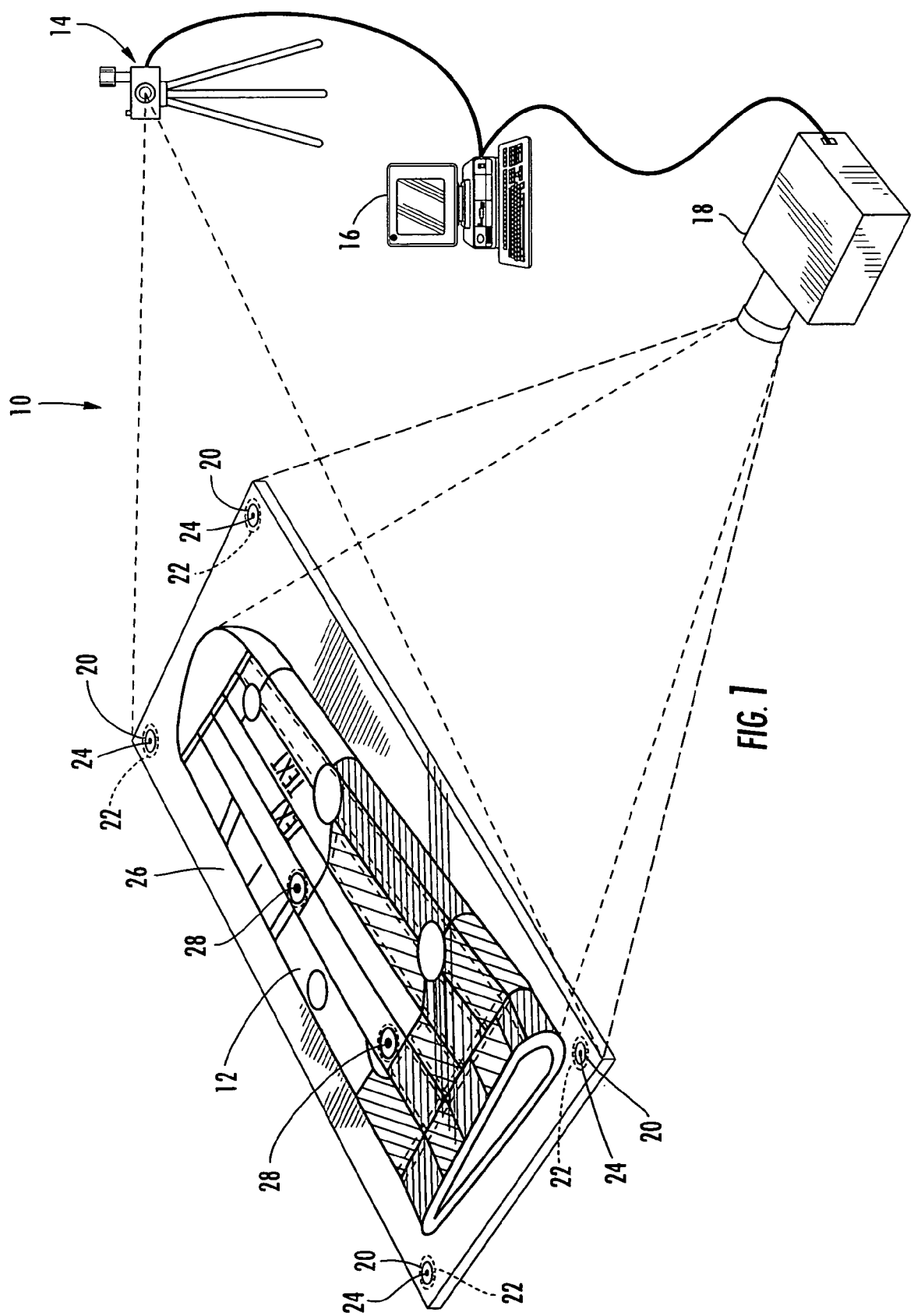
Figure 2:
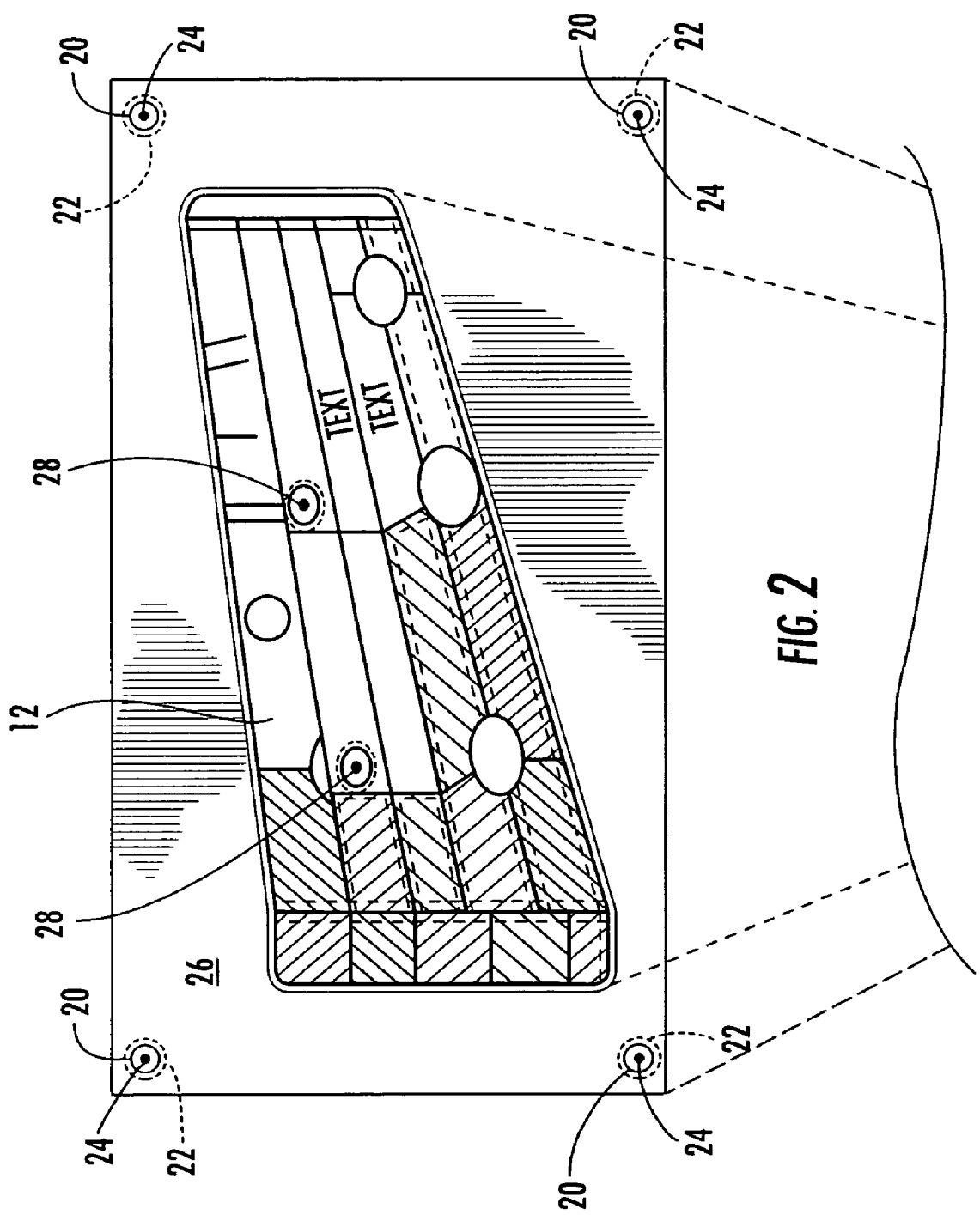
Figure 3:
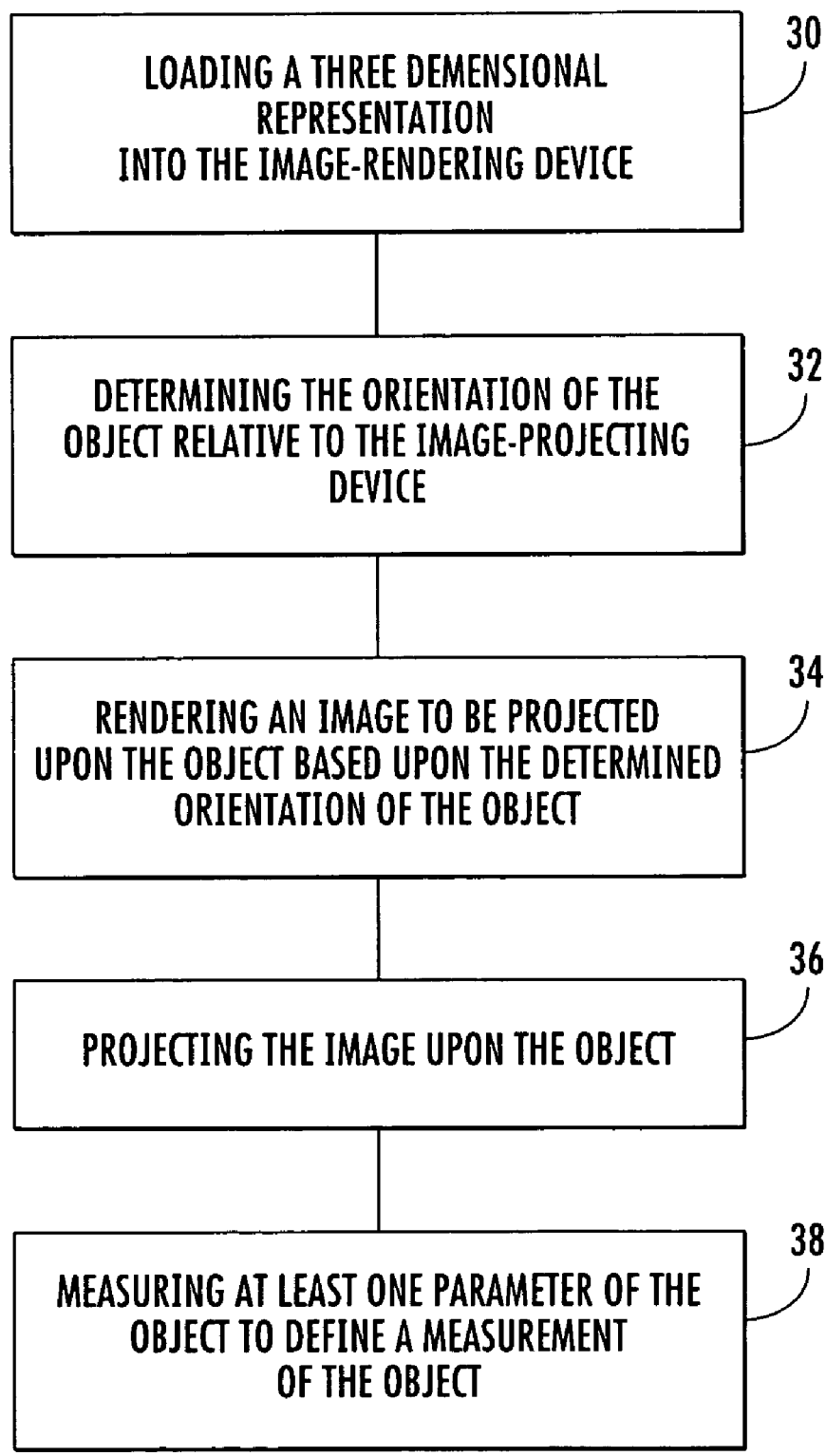

Having thus described the invention in general terms, reference will now be made to the accompanying drawings, which are not necessarily drawn to scale, and wherein:

FIG. 1 is a perspective view of an optical projection system according to one embodiment of the present invention, illustrating the image-projecting device projecting an image onto an object;

FIG. 2 is a top elevational view of the image and object shown in FIG. 1, illustrating the targets in mechanical communication with the object; and FIG. 3 is a flowchart illustrating steps to project an image upon an object according to one embodiment of the present invention.

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

With reference to FIGS. 1-3, an optical projection system 10 in accordance with one embodiment of the present invention is illustrated. The optical projection system 10 of FIGS. 1-3 is advantageously used for the assembly and inspection of objects; however, it should be appreciated that the present invention may be used in any application wherein optical images are projected. Furthermore, FIGS. 1-2 illustrate the object 12 as being an aircraft wing portion; however, it should be appreciated that the optical projection system 10 may be used in conjunction with any object, regardless of the shape, size, material, or other parameters of the object and may be used in any industry.

Referring to FIG. 1, the optical projection system 10 for use during assembly and/or inspection of the object 12 comprises a target-locating device 14, an image-rendering device 16, and an image-projecting device 18. The orientation of the image-projecting device 18, relative to the object 12, can be determined after comparing the location of at least one target 20, which preferably comprises at least three targets, to corresponding target projections 22 and 24 projected by the image-projecting device onto the target. As explained more fully below, the first and second target projections 22 and 24 are projected by the image-projecting device 18 to eliminate any misalignment of the first target projection and the target and to determine the projection vector of the image-projecting device using the second target projection. The orientation of the image-projecting device 18 relative to the object 12 may be determined using the determined projection vector of the image-projecting device.

The determined projection vector of the image-projecting device 18 is communicated to the image-rendering device 16 which determines the orientation of the image-projecting device 18 relative to the object 12. A three dimensional representation of the object 12, which include the portions to be measured or located, is stored in the image-rendering device 16, which renders the image that the image-projecting device 18 will project onto the object. The image that is projected upon the object 12 can advantageously be used by technicians and/or by automated devices that are assembling or inspecting the object, as also discussed more fully below.

The target-locating device 14 of FIG. 1 is advantageously a digital camera that captures digital images of at least a portion of the object 12. The digital camera is generally in a fixed position and orientation relative to the image-projecting device 18. Preferably, the digital camera is located adjacent the image-projecting device 18 to simplify the alignment of the projected image; however, the target-locating device may be positioned at any location since any misalignment errors of the target projections or projected image are driven to zero. In further embodiments of the present invention, the target-locating device may comprise alternative devices, such as a laser radar, a tracking laser interferometer, or an theodolite measurement system, to list a few non-limiting examples. In such cases, however, the mechanism for locating the targets, and accordingly the eye point of the image-projecting device, is different than the methods described herein for the digital camera. These and other three-dimensional measurement devices must be positioned such that they can measure the position and orientation of both the object 12 and image-projecting device 18, and hence compute the relative position and orientation of both to determine the orientation of the image-projecting device. In still further embodiments of the present invention, a position sensing device may act as a target and directly transmit misalignment of the target projections to the image rendering device, thereby eliminating the target-locating device. In additional embodiments of the present invention, a technician may determine the orientation of the image-projecting device by locating the object at a known orientation relative to the image-projecting device.

For the optical projection system 10 of FIGS. 1-3, the orientation of the image-projecting device 18 is determined by projecting first and second target projections 22 and 24 onto the target 20. The target-locating device 14 captures any misalignment of the first target projection 22 and target and sends the results to processing circuitry, such as a processor or other computing device, of the image-rendering device 16 to determine the misalignment of the projection and target. More specifically, the first target projection 22 are sequentially projected to align the projections with the target 20. Advantageously, the target 20 comprises a cooperative target, such as a retro-reflective target to list one non-limiting example. The first target projection 22 is larger than the target 20, as shown in FIGS. 1 and 2, so that the target is completely illuminated thus providing the measured centroid of the target. The second target projection 24 is smaller than the target to partially illuminate the target 20 and is used by the target-locating device 14 to determine the projection vector of the image-projecting device 18, from which the eye point of the image-projecting device may be determined. The projection vector and/or eye point of the image-projecting device 18 is then used to determine the orientation of the image-projecting device relative to the object 12. The image-rendering device 16 determines any misalignment errors and adjusts the locations of where the second target projection 24 will be projected. This process of projecting, locating, processing, and adjusting is repeated until the misalignment is within a predetermined range, preferably with a misalignment of zero. Once the misalignment is within the predetermined range, the orientation of the image-projecting device relative to the object is determined. The optical projection system 10 of FIG. 1 advantageously incorporates the target projections 22 and 24 with the image projected upon the object, and although the image upon the object may remain substantially static, the target projections 22 and 24 may be sequentially projected, or only the second target projection 24 may be projected. Further embodiments of the present invention may project the target projections simultaneously using two different colors to determine the misalignment or may determine the misalignment by alternative methods.

Advantageously, the target-locating device 14 is capable of locating at least one target 20 that is in mechanical communication with the object 12. Preferably the target-locating device 14 locates two or more targets 20, and more preferably locates three or more targets. Three or more targets are preferred because the resection requires at least three targets so there will be six equations to solve for the six unknowns of the XYZ positions and the three axis of rotation. However, the optical projection system of the present invention may use any number of targets to determine the orientation of the image-projecting device relative to the object. The targets 20 are in mechanical communication with the object 12 when they are positioned at fixed and/or known locations relative to the object during the assembly and/or inspection of the object, such that the angles from the targets, which are on or adjacent the object, to the corresponding image-projecting device 18 may be ascertained. The targets 20 of FIG. 1 may be reference points, cooperative targets, or any other device or feature that is recognizable by the target-locating device 14 and that may be projected upon by the image-projecting device 18. The targets 20 of FIG. 1 are mounted adjacent, but with a known relative orientation in a common coordinate system, to the object 18, such as on a plate 26 upon which the object is positioned, such that the object is stationary relative to the targets during the assembly and/or inspection of the object. Targets 28 may also be provided on the surface of the object 12 and may be used individually, or in combination with the targets 20, to determine the orientation of the image-projecting device 18. The targets 28 are advantageously attached cooperative targets or can be features on the surface of the object such as fastener heads, protrusions, indicia, or any other feature of the object, to list non-limiting examples. Because the target 28 is located on the surface of the object 12, it is also in mechanical communication with the object. The optical projection system 10 of FIG. 1 can also facilitate the projection of an image onto a moving object if the response time of the target-locating device 14 is sufficiently quick to allow real-time detection of the movement of the targets and the processing circuitry of the image-rendering device 16 is sufficiently quick to properly adjust the projected target projections 22 and 24 and image of the object.

For the optical projection system 10 of FIG. 1, the images or other information captured by the target-locating device 14 is communicated, either through electrical connections or with a wireless device, to the image-rendering device 16 for determining the orientation of the image-projecting device 18 relative to the object 12 and which renders the image that will be projected onto the object. The image-rendering device 16 of FIG. 1 is advantageously comprised of processing circuitry, such as a processor or other computing device. The image-rendering device 16 advantageously stores a three-dimensional representation of the object 12, preferably in a CAD model, although further embodiments may store alternative three-dimensional representations. The image-rendering device 16 advantageously converts the three-dimensional representation to a two-dimensional image that the image-projecting device 18 will project. The conversion incorporates the determined orientation of the image-projecting device 18 relative to the object 12 and sizes the two-dimensional image so that the image projected onto the object substantially coincides with the surface of the object. More specifically, the image that is projected advantageously includes lines, non-linear patterns, colors, text, combinations thereof, and other properties that advantageously are projected onto the actual features, surfaces, or other properties of the object to which the image properties coincide. Non-limiting examples of the image coinciding with the object, which are illustrated in FIG. 2, are dashed lines offsetting the joint lines of the assembled object, lines overlapping the joint lines, one or more circles centered upon features of the object, various colors representing individual panels of the object, and the like.

The image-projecting device 18 receives the rendered image from the image-rendering device 16 by wireline connections or by wireless devices. The image-projecting device 18 is advantageously a digital projector; however, further embodiments of the present invention may comprise alternative devices or may comprise more than one image-projecting device. The image-projecting device 18 advantageously provides an image that is bright enough to be seen by technicians during assembly and/or inspection, or to be recognized by automated devices that may utilize the image, such as photogrammetric measurement systems, to list one non-limiting example.

Projecting the image onto the object is beneficial to the technicians or the automated devices assembling and/or inspecting the object 12. Non-limiting examples of uses of the image include projecting at least two different colors onto the object to illustrate various boundaries on the surface of the object to ensure that the various components constituting the object are properly assembled, projecting lines onto joint lines in the object to again ensure proper assembly, projecting measurement points onto the surfaces of the object to facilitate either manual or automatic measurements of the object and subsequently projecting the measurement results onto the surface at the point of measurement, and projecting text onto the surface of the object to assist technicians during assembly and/or inspection. One of many benefits of providing such information is that the projection having text can be used in lieu of a cathode ray tube screen, other monitors, or paper documentation. When the image-rendering device 16 is used in combination with various measurement devices, the resulting measurements can be projected upon the object.

By providing a static image, as opposed to laser patterns provided by laser projector systems, the optical projection system 10 of the present invention also enables automatic measurements of the object by projecting measurement points onto the object which a photogrammetry system can use to measure various parameters of the object. Specifically, some embodiments of the present invention provide measurement points within the image so that a technician or automated device will know precisely where measurements should be taken. Further embodiments of the present invention may comprise alternative measurement devices, either automated or manual, such as ultrasonic thickness gauges, laser radar devices, calipers, or micrometers to list a few non-limiting examples. Accordingly, the image projected onto the object may be used to facilitate the measurement of at least one parameter of the object to determine if the parameter of the object satisfies a predetermined criteria. For example, the thickness of a particular portion of the object may be measured to determine if the measured thickness falls within predetermined tolerances, to list one non-limiting example. An image with color and/or numerical results indicating the acceptability or the actual thickness measurement, respectively, can be subsequently projected onto a surface of the object, to list an example of how the measurement results may be included in the image.

The image-rendering device 16 of the present invention advantageously randomizes the measurement locations when inspecting a series of locations to provide more accurate process statistics. By randomizing the measurement locations, the likelihood that data will include structured process errors can be reduced or eliminated. For example, the image-projecting device may define measurement points for a first object at first, second, and third locations that are all different locations. For a second object being assembled and/or inspected, the image-projecting device may define measurement points at randomly different first, second, and third locations that are also different locations, and so forth.

Advantageously, the measurements of the object are taken with digital instruments such that the measurements may be electronically communicated, by wireline connections or by wireless devices, to the image-rendering device or other processing circuitry. By providing the measurement data in substantially real time, the processing circuitry is able to adjust the assembly or inspection in real time to improve the efficiency of the assembly and/or inspection. Furthermore, when the measurements are manually taken, the image-rendering device advantageously includes the measurement as text in the image projected onto the object for a technician to read, so that the technician may take the measurements more efficiently. Still further advantages are provided by electronically communicating the measurements to the optical projection system.

The present invention also provides methods of inspecting an object by projecting an image onto the object. The inspection method advantageously includes a preliminary step of assembling two or more components to define the object to be inspected. FIG. 3 is a flow chart illustrating steps 30 through 38 for inspecting an object by a method of the present invention. Step 30 comprises loading a three-dimensional representation of the object into the image-rendering device. Step 32 comprises determining the orientation of the image-projecting device relative to the object. Furthermore, step 34 comprises rendering an image to be projected upon the object based upon the determined orientation of the image-projecting device. Step 36 comprises projecting the image upon the object. Finally, step 38 comprises measuring at least one parameter of the object to define a measurement of the object, such as a caliper measurement to determine the distance between two measurement points on the object. Further embodiments of the present invention may comprise additional steps, fewer steps, and/or alternative steps to determine an angular position of a target.

The measurements, determinations, calculations, and other actions provided by the present invention are advantageously performed by an apparatus with processing circuitry, such as a processor or other computing device. Such processor or other computing device advantageously actuates the target-locating device, the image-projecting device, and the measurement device. The various methods of the present invention are generally implemented by a computer program product that may direct the operation of the processing circuitry. This computer program product includes a computer-readable storage medium, such as a non-volatile storage medium, and computer-readable program code portions, such as a series of computer instructions, embodied in the computer-readable storage medium. Further implementations of the present invention may be performed by alternative devices.

It will be understood that each step 30 to 38 of the flowchart can be implemented by or with computer program instructions. These computer program instructions may be loaded onto processing circuitry, such as on a computer or other programmable apparatus to perform the functions of the present invention, such that the instructions which execute on the computer or other programmable apparatus create means for implementing the functions specified in the flowchart blocks or steps. These computer program instructions may also be stored in a computer-readable memory that can direct a computer or other programmable apparatus to function in a particular manner, such that the instructions stored in the computer-readable memory perform the measurements, determinations, and actions illustrated in the flowchart blocks or steps. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart blocks or steps.

Accordingly, blocks or steps of the flowchart of FIG. 3 support combinations of means for performing the specified functions, combinations of steps for performing the specified functions, and program instruction means for performing the specified functions. It will also be understood that each block or step of the flowchart, and combinations of blocks or steps in the flowchart, can be implemented by special purpose hardware-based computer systems that perform the specified functions or steps, or combinations of special purpose hardware and computer instructions.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An optical projection system comprising:
   an image-projecting device for projecting an image onto an object;
   a target-locating device for determining misalignment of at least one target relative to corresponding target projections projected by the image-projecting device to determine the orientation of the image-projecting device relative to the object, wherein the at least one target is in mechanical communication with the object; and
   an image-rendering device for rendering the image projected by the image-projecting device based upon the determined orientation of the image-projecting device relative to the object.

2. An optical projection system according to claim 1 wherein the image-projecting device comprises a digital projector.

3. An optical projection system according to claim 1 wherein the image-projecting device projects an image that includes at least two different colors.

4. An optical projection system according to claim 1 wherein the image-projecting device projects an image that includes text.

5. An optical projection system according to claim 1 wherein the target-locating device comprises a camera.

6. An optical projection system according to claim 1 wherein the at least one target comprises three targets.

7. An optical projection system according to claim 1 wherein the at least one target comprises a measurement point on the object.

8. An optical projection system according to claim 1 wherein the at least one target comprises a cooperative target.

9. An optical projection system according to claim 8 wherein the image-projecting device projects sequential projections of different sizes such that the larger projection illuminates the entirety of the target, thereby defining the centroid of the at least one target, and the smaller projection partially illuminates the at least one target, thereby defining the projection vector of the image-projecting device.

10. An optical projection system according to claim 1 wherein the image-rendering device stores a three-dimensional representation of the object such that the image-rendering device converts the three-dimensional representation into a two-dimensional image that is projected by the image-projecting device.

11. An optical projection system according to claim 1, further comprising a measurement device that measures a portion of the object and communicates the measurement to the image-rendering device.

12. An optical projection system according to claim 11 wherein the measurement device comprises an ultrasonic thickness gauge.

13. A method of inspecting an object, the method comprising the steps of:
determining an orientation of an image-projecting device relative to the object by determining misalignment of at least one target relative to corresponding target projections projected by the image-projecting device, wherein the at least one target is in mechanical communication with the object;
rendering an image to be projected upon the object based upon the determined orientation of the image-projecting device relative to the object; and
projecting the image upon the object, wherein the image is projected by the image-projecting device.

14. A method according to claim 13, further comprising the step of measuring at least one parameter of the object to define a measurement of the object.

15. A method according to claim 14, further comprising the step of communicating the measurement to an image-rendering device.

16. A method according to claim 15, further comprising the step of projecting data relating to the measurement upon the object.

17. A method according to claim 14 wherein measuring at least one parameter of the object comprises measuring the object with an ultrasonic thickness gauge.

18. A method according to claim 13, further comprising the initial step of assembling two or more components to define the object.

19. A method according to claim 13, further comprising the step of comparing the image projected upon the object to at least one parameter of the object to determine if the parameter of the object satisfies a predetermined criteria.

20. A method according to claim 13 wherein projecting the image comprises projecting an image having linear and non-linear patterns.

21. A method according to claim 13 wherein projecting the image comprises projecting an image having at least two different colors.

22. A method according to claim 13 wherein projecting the image comprises projecting an image having text.

23. A method according to claim 13 wherein determining the orientation of the image-projecting device relative to the object comprises determining misalignment of three targets that are in mechanical communication with the object.

24. A method according to claim 13 wherein determining the orientation of the image-projecting device relative to the object comprises determining misalignment of at least one measurement point on the object.

25. A method according to claim 13 wherein determining the orientation of the image-projecting device relative to the object comprises determining misalignment of at least one cooperative target.

26. A method according to claim 13 wherein determining the orientation of the image-projecting device relative to the object comprises projecting sequential target projections on the at least one target such that the larger projection illuminates the entirety of the target, thereby defining the centroid of the at least one target, and the smaller projection partially illuminates the at least one target, thereby defining the projection vector of the image-projecting device.

27. A method according to claim 13 wherein rendering the image comprises converting a three-dimensional representation into a two-dimensional image.

\* \* \* \* \*